Oct. 20, 1959 W. A. BLACK 2,909,762

CODED SIGNAL RECEIVER

Filed Jan. 29, 1957 4 Sheets-Sheet 1

INVENTOR
WILLIAM A. BLACK, DECEASED,
by: MARION BENNETT BLACK, EXECUTRIX by: H. H. Hulse ATTY Oct. 20, 1959 W. A. BLACK 2,909,762

CODED SIGNAL RECEIVER

Filed Jan. 29, 1957 4 Sheets-Sheet 2

INVENTOR
WILLIAM A. BLACK, DECEASED,
by: MARION BENNETT BLACK, EXECUTRIX
by: H. H. Hulse ATTY Oct. 20, 1959 W. A. BLACK 2,909,762

CODED SIGNAL RECEIVER

Filed Jan. 29, 1957 4 Sheets-Sheet 3

INVENTOR
WILLIAM A. BLACK, DECEASED,
by: MARION BENNETT BLACK, EXECUTRIX by: [signature] ATTY Oct. 20, 1959 W. A. BLACK 2,909,762

CODED SIGNAL RECEIVER

Filed Jan. 29, 1957 4 Sheets-Sheet 4

INVENTOR
WILLIAM A. BLACK, DECEASED,
by: MARION BENNETT BLACK, EXECUTRIX
by: [signature] ATTY

United States Patent Office 2,909,762
Patented Oct. 20, 1959

2,909,762

CODED SIGNAL RECEIVER

William A. Black, deceased, late of Montclair, N.J., by Marion Bennett Black, executrix, Montclair, N.J., assignor to General Time Corporation, New York, N.Y., a corporation of Delaware Application January 29, 1957, Serial No. 637,008

9 Claims. (Cl. 340—164)

This invention relates generally to remotely controlled selector switches and more particularly, to switch actuating receivers responsive to coded signals.

Switches of this type are intended for use in a system that includes a transmitter and a plurality of receivers connected to a common power line for producing selective actuation of any one of the switches by transmitting an appropriate pattern of signals on the line. Selector switches of this type have found particular utility when installed on a regular 60 cycle power line for controlling a plurality of appliance receiving power from such line or other power source, with the receivers made responsive to high frequency signals superimposed on the line. The operation of any one of the appliances may thus be selectively controlled from a central control station.

It has been found that systems of this type often have interference in the form of stray and unwanted signals transmitted along the line which are generated by various pieces of electrical equipment. Transient signals of this type have abrupt wave fronts including many different frequency components, often including the frequency at which the receiver is set to respond, and are thus particularly troublesome in selective remote control systems of the present type.

Accordingly, it is an object of the invention to provide an improved, coded-signal responsive receiver for actuating a switch that is unaffected by stray or transient signals. It is a more detailed object to provide a device of this character that is actuated only by a predetermined code of signals spaced in time sequence, each signal being required to be of sustained duration so that transients cannot trip or condition the receiver accidentally.

It is another object to provide a device of the above type which is safe in operation in that it is impossible for stray or transient signals to cause the receiver to become jammed or locked so as to damage the device or prevent proper operation.

It is a further object to provide a receiver of the above type that, when once selected from the others on the line, is capable of performing either of two functions in response to a further signal. It is a collateral object to provide a unit of this type which is selectively responsive to a pattern of three signal impulses and thus permits a large number of codes to be employed so that an equally large number of units can be utilized on the same line.

It is also an object to provide a unit of the type referred to above that is sturdy, foolproof and reliable.

Other objects and advantages of the invention will become apparent upon reading the attached detailed description and upon reference to the drawings in which.

While the invention will be described in connection with a preferred embodiment, it will be understood that I do not intend to limit the invention to that embodiment, but, on the contrary, intend to cover such alternative embodiments and constructions as may be included within the spirit and scope of the appended claims.

Figures 1, 2:
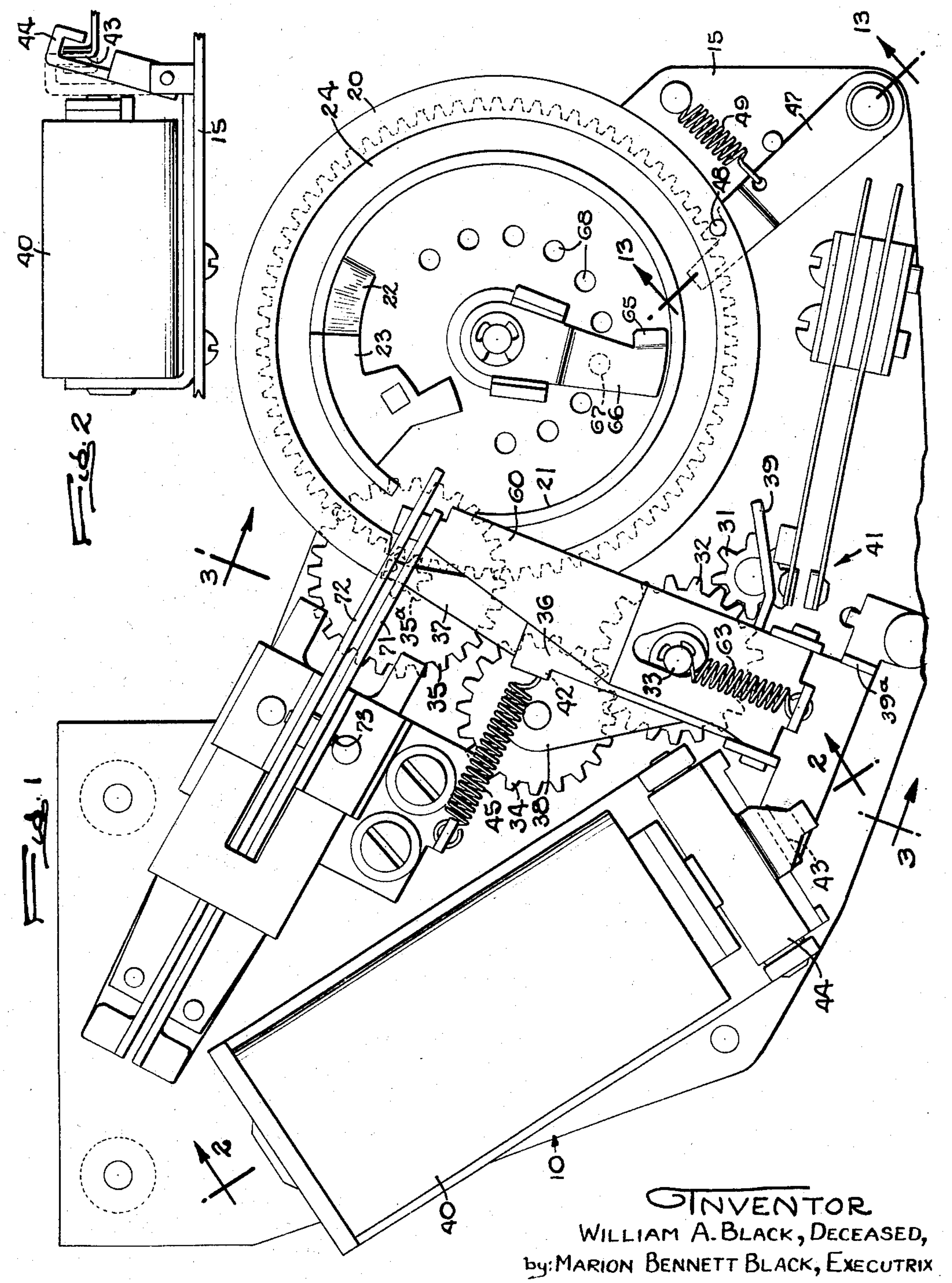
Figure 1 is a plan view of a coded signal receiver constructed according to the present invention.
Fig. 2 is a partial sectional view taken along line 2—2 of Fig. 1.
Figure 16:
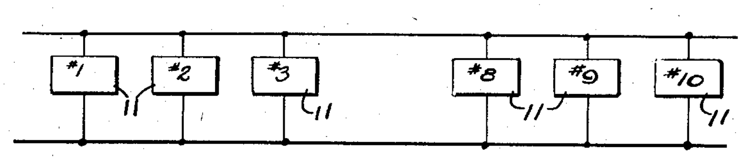
Fig. 16 is a schematic wiring diagram of the system in which the invention is utilized.
Figure 3:
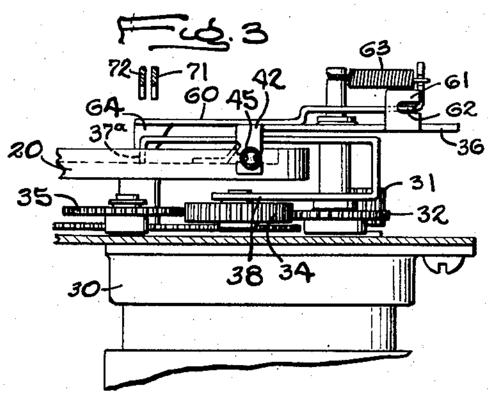
Fig. 3 is a partial sectional view taken along line 3—3 of Fig. 1.
Figure 15:
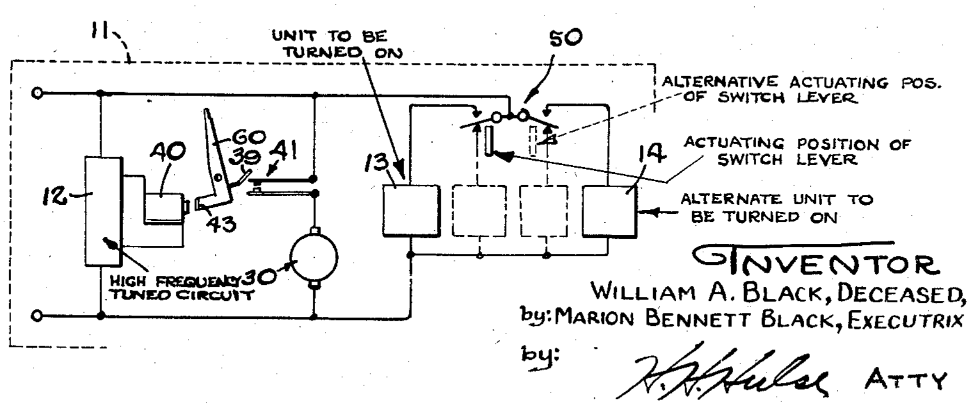
Fig. 15 is a schematic wiring diagram of the circuit utilized by the invention.

Turning first to Figs. 1, 2 and 3, there is shown a receiver 10 constructed according to the present invention which comprises generally a timing disc 20 adapted to be driven by an electric timing motor 30, an electromagnet 40 which, through a switch 41, controls the operation of motor 30, and a switch assembly 50 which has contacts that may be selectively opened and closed to permit remote actuation of electrically operated units with which the receiver 10 may be associated. The receiver 10 is intended to be incorporated as an integral part of the assembly 11, which is shown schematically in Fig. 15, and which may be connected in parallel with a plurality of similar units 11, as shown in Fig. 16, to constitute a desired system.

Turning more particularly to the assembly 11 in which the receiver 10 is utilized, it will be noted (see Fig. 15) that the assembly includes a high frequency tuned circuit 12, connected across the power lines of the system, which is effective to energize electromagnet 40 upon receiving a signal of the desired frequency superimposed upon the normal 60 cycle power lines. The circuit 12 may take any well-known form, and since it is not per se a part of the invention, it is not disclosed with more particularity herein. The timing motor 30 is also connected across the power lines and is energized when switch 41 is closed under the urging of electromagnet 40.

When the receiver 10 senses a certain predetermined code or pattern of high frequency signals on the power line, it is effective to operate switch 50 to energize either an electrical unit 13 connected on the power line or an alternate unit 14. It can, therefore, be seen that each assembly 11 may include two electrical units 13, 14 that may be selectively actuated in response to a predetermined code or pattern of high frequency signals over the normal power lines of the system, and a number of such assemblies 11 connected on the same power line can be controlled from a single station which is provided with a suitable transmitter (not shown) to transmit high frequency signals over the line.

Describing the operation of the receiver 10 generally, the energization of electromagnet 40, in response to an incoming signal, closes switch 41 to energize motor 30. The magnet is also effective to drivingly connect the motor to timing disc 20. Energization of magnet 40, in addition, moves an actuator lever 60 within a holding track 21 formed on the timing disc. If the magnet 40 remains energized for a predetermined length of time the drive for disc 20 is "locked in" for one full revolution of the disc, i.e., for a single cycle. The speed of motor 30 is selected so that each revolution or cycle of the disc 20 requires an interval of one minute. As the disc rotates, the actuator 60 remains within the holding track 21, but after a predetermined number of seconds from the initiation of a cycle, the magnet 40 must be again energized by a second signal or the actuator 60 is caused to move out of the track 21. If the proper signal is transmitted and the magnet 40 thereby energized at the proper time, the actuator 60 will remain held within the track 21 and, near the end of the cycle, the actuator 60 will be raised by an inclined cam surface 22 so that the tip of the actuator rests on an operating surface 23 during the final portion of the cycle. When the tip of actuator 60 rests on the operating surface 23, one of the contacts of the switch assembly 50 is operated so as to close a circuit to one of the electrical units 13 or 14.

Turning now with more particularity to the means for rotating the timing disc 20 through a full cycle, it can be seen that the motor 30 is mounted beneath a receiver base plate 15 and has a motor pinion 31 that extends upwardly through the base plate to mesh with an idler gear 32 which is freely rotatable on a supporting shaft 33. Meshing with idler gear 32 is a shiftable gear 34 which may be swung about the shaft 33 and into meshing engagement with a fixed gear 35 having a pinion **35*a* in constant driving engagement with the timing disc 20**.

In order to couple the gear 34 to the gear 35 and thus complete the driving train between motor 30 and disc 20, a carrier lever 36 and a holding lever 37 having an arm 38 are provided, the arm 38 serving to support the gear 34. The lever 37 also includes a projecting arm 39 which is effective to engage and close the switch 41 in the motor circuit. Therefore, when the holding lever 37 is swung in a clockwise direction (see Fig. 1), the arm 39 will engage switch 41 and energize motor 30, and the arm 38 will carry shiftable gear 34 into engagement with gear 35 and thus enable the rotating motor to drive the timing disc 20.

For the purpose of swinging the holding lever 37 at selected times, the carrier lever 36 is connected to be pivoted by magnet 40 and has a depending lip 42 to engage and rotate the lever 37 in a clockwise direction when the magnet 40 is actuated to pivot the carrier lever. Operatively connecting the magnet 40 to carrier lever 36 is a pivoted hook-shaped armature 44 (Fig. 2) that hooks an upturned portion 43 of carrier lever 36 and is swung toward the magnet when the latter is energized to draw portion 43 with it and thereby pivot lever 36. The carrier lever 36 is biased to its initial or starting position against a stop **39*a* by means of a tension spring 45**.

In brief summary of the portion of the device thus far described, it can be seen that when the magnet 40 is energized the armature 44 snaps into an upright position pulling portion 43 and thus pivoting the carrier lever 36 in a clockwise direction against the urging of spring 45. As the carrier lever 36 swings about its pivot 33, the depending lip 42 engages and pivots the holding member 37 also about shaft 33. Moving lever 37 in a clockwise direction closes switch 41 and engages the gears 34, 35 so as to both energize the motor 30 and transmit its driving force to the timing disc 20.

It is a feature of the invention that the magnet 40 must remain energized for a certain predetermined time interval before the drive for timing disc 20 locks in and causes it to revolve through a full cycle. Thus, an initial signal of sustained duration is required and it is not possible for the device to be actuated upon receiving a casual transient signal of short duration. In the present embodiment, the means for locking in the drive for timing disc 20 after the magnet 40 has been held energized for a predetermined period comprises a holding track 24, formed on the disc 20, which is effective to engage a depending tip **37*a* of the holding lever 37 and lock this lever in its clockwise rotative position. The holding track 24 is provided with an entryway 25 of predetermined peripheral length which permits the tip 37*a* of holding lever 37 to move within the track 24 under the urging of the magnet 40. Because of the length of the entryway the disc 20 must be rotated through a certain angle before the holding track 24 becomes effective to lock the holding lever 37 in its clockwise position. If the magnet 40 is deenergized before the holding track 24 comes around to engage the depending tip 37*a* of holding lever 37, the lever will swing counterclockwise under the urging of spring 45 against the stop 39*a* and thus disengage the gears 34, 35 and open the switch 41**.

Figure 13:
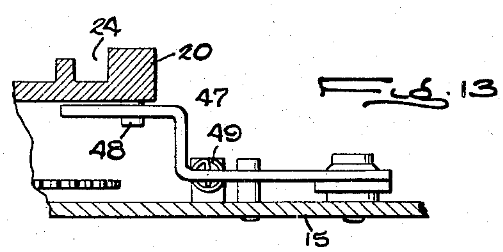
Fig. 13 is a detailed sectional view taken along line 13—13 of Fig. 1.

To rotate the timing disc 20 back to its initial starting position when the magnet 40 is prematurely deenergized, as for example, by a spurious signal of less than predetermined duration, means are provided for restoring the disc to the starting point. In the present instance this is accomplished by a pivoted lever 47 biased by a spring 49, the lever engaging a stud 48 formed on the underside of disc 20 (see Figs. 1 and 13). As the timing disc 20 begins to rotate, the stud 48 pivots the lever 47 against the resistance of the spring 49. Thus, when the magnet 40 is deenergized and the gears 34, 35 are disengaged, the spring-urged lever 47 is effective to return the timing disc 20 in a counterclockwise direction to its initial or starting position.

Therefore, it can be seen that in the present device the magnet 40 must remain energized until the holding track 24 is carried around by the timing disc 20 to engage the holding lever 37 and thus lock in the drive for the timing disc. It will be apparent that as the disc 20 completes its full cycle, the tip **37*a* of holding lever 37 will be released and allowed to swing back through the entryway 25 under the urging of the spring switch 45, thus bringing the timing disc 20 to a halt and stopping the operation of motor 30. When the drive is interrupted, the biasing lever 47 will, of course, yieldingly restrain the disc 20** in its initial starting position ready to begin another cycle.

In accordance with the present invention a switch actuator is moved, incident to the actuation of the carrier lever 36, to a position where means carried by the timing disc 20 will cause it to operate the switch 50 near the end of a timing cycle, and means on the disc are provided to hold the actuator in its switch operating position if the magnet 40 remains actuated for a sustained initial period but to release the actuator unless the magnet is again actuated for a sustained period following at a predetermined interval the initial actuation. In the present embodiment the carrier lever 36 pivotally supports an actuator 60 so that the actuator 60 will move with the lever 36 about the pivot shaft 33 but will be free to swing upwardly in a direction away from lever 36. The pivotal connection between carrier lever 36 and actuator 60 (see Fig. 3) comprises two upstanding hook-shaped flanges 61 formed on lever 36 into which are loosely fitted lugs 62 formed on the actuator 60. A spring 63 holds the lugs 62 within the hooks of flanges 61 and biases the actuator 60 to a position parallel to carrier 36. For permitting the disc 20 to hold and manipulate the actuator 60, the actuator is formed with a longitudinally extending runner 64 at its outer end which is biased by spring 63 into contact with the disc 20. When the magnet 40 is energized to swing the carrier lever 36 in a clockwise direction, the actuator 60 is also carried in a clockwise direction about the pivot shaft 33, and its runner 64 passes through an entryway 26 in the track 21 (see Fig. 4). If the magnet 40 remains energized for a period of the required duration the disc 20 will rotate the track 21 so as to hold the runner 64 and prevent the actuator 60 and the carrier lever 36 from returning to their rest positions under the urging of spring 45.

As the timing disc 20 continues to rotate, a positionable cam 65 engages the actuator runner 64 to lift it from the track 21 (see Figs. 9 and 10), thus freeing the actuator 60 from track 21 and allowing the force of spring 45 to return the carrier 36 and actuator 60 in a counterclockwise direction to their original rest positions. The latter occurs in an idle cycle. However, in an active cycle, the magnet 40 is energized and remains energized while the cam 65 holds the runner 64 above and free of the track 21. Thus, the actuator 60 is not returned to its original position but is held by magnet 40 in its position of clockwise rotation so that the runner 64 is permitted to drop from the passing cam 65 for reengagement by the track 21. Once the positional cam 65 has passed beneath the runner 64 and the runner remains held by the track 21, the actuator cannot be returned to its rest or initial position until after actuation of a switch at the end of the complete timing cycle.

It will be noted that due to the width of the runner 64 and the fact that the cam 65 projects slightly above the track 21, the runner 64 will be above the track 21 for an appreciable interval of time. Therefore, the magnet 40 must remain energized throughout this interval if the actuator runner 64 is to drop from the cam 65 and remain within the track 21.

Figure 12:
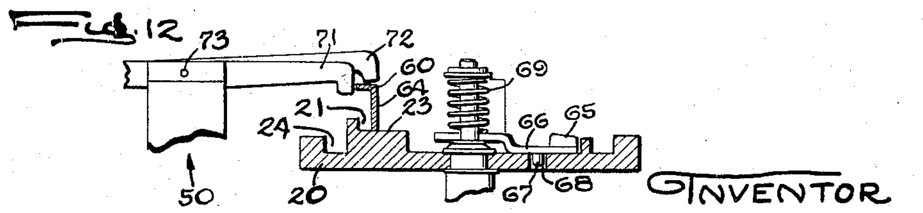
Fig. 12 is similar to Fig. 11 with the parts being shown in an alternative position.

In keeping with the invention the positionable cam 65 may be firmly held in any one of a plurality of positions along the track 21. As can be seen in Figs. 1 and 12, the cam is formed as a part of an arm 66 which is freely swingable about the axis of disc 20 and which carries a stud 67 on its lower surface to positively position the arm 66 in one of its angular postions. The stud 67 is set within a selected one of the plurality of holes 68 formed in disc 20, of which, in the present embodiment, there are ten in number. For preventing the stud 67 from being accidentally dislodged from the selected hole 68, a spring 69 bears downwardly on the arm 66. When adjusting the position of the cam 65, the arm 66 may be lifted compressing the spring 69 and the stud 67 placed within any of the desired holes 68.

Figure 11:
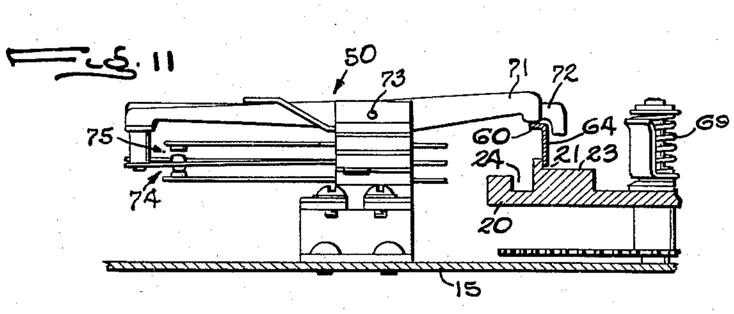
Fig. 11 is a partial sectional view taken along line 11—11 of Fig. 8.

In accordance with a further aspect of the invention the timing disc 20 carries means to cause the actuator 60, when it is retained by track 21 near the end of the timing cycle, to selectively actuate either one of two switches comprising switch assembly 50 in response to the control of magnet 40. In the present embodiment the runner 64 engages the cam surface 22 near the end of the timing cycle and the actuator 60 is pivotally cammed onto the actuator surface 23. Closely overlying the actuator 60 are the tips of the switch levers 71, 72 (see Figs. 11 and 12) and the proportions of the parts are so selected that when the actuator 60 is pivoted so that its runner 64 is supported on the surface 23, the actuator will engage and pivot one of the switch levers 71, 72 about their common pivot 73. Associated with each of the levers 71, 72 is a pair of contacts 74 arranged so that when one of the levers is slightly pivoted by the actuator 60 it will close the associated contact 74 and complete the circuit which the receiver 10 is intended to control. So that the actuator 60 may selectively actuate either the lever 71 or the lever 72 under the control of magnet 40, the switch lever 72 is somewhat longer than the lever 71 so as to overlie the different portion of the surface 23. If the runner 64 remains in engagement with the track 21 and rises onto surface 23, the shorter switch lever 71 will be engaged by the actuator and its associated contact 74 will close. If however, the magnet 40 is energized as the runner 64 is contacted by the camming surface 22, so as to swing the carrier lever 36 and the actuator 60 toward the center of the disc 20 and thus move the runner 64 away from the track 21 it can be seen that the actuator 60 will engage the longer switch lever 72 (see Fig. 12) when the runner rests on the surface 23, and therefore, the contacts associated with the switch lever 72 will be closed. It can, therefore, be seen that the energization of the magnet 40 at the time during the timing cycle when the runner 64 first is engaged by the cam surface 22, can control which of the two switch levers 71, 72 will be actuated by the rising actuator 60.

One of the features of the invention is that each of the switch levers 71, 72 controls two sets of contacts so that when one of the levers is pivoted by the actuator 60, one set of contacts may be opened and a second set will be closed. In the present embodiment (see Fig. 11) it can be seen that when switch lever 71 is tilted by the actuator 60 the contacts 74 will be closed. However, also incident to the tilting of lever 71, contacts 75 will open. It is possible, therefore, to alternatively connect the receiver 10 so that the switch levers 71, 72, when actuated, will either make or break a circuit to the unit being controlled. It is apparent that one of the switch levers 71, 72 can be connected to break a current to a desired unit and the other of the levers can be connected so as to make a circuit.

Figure 4:
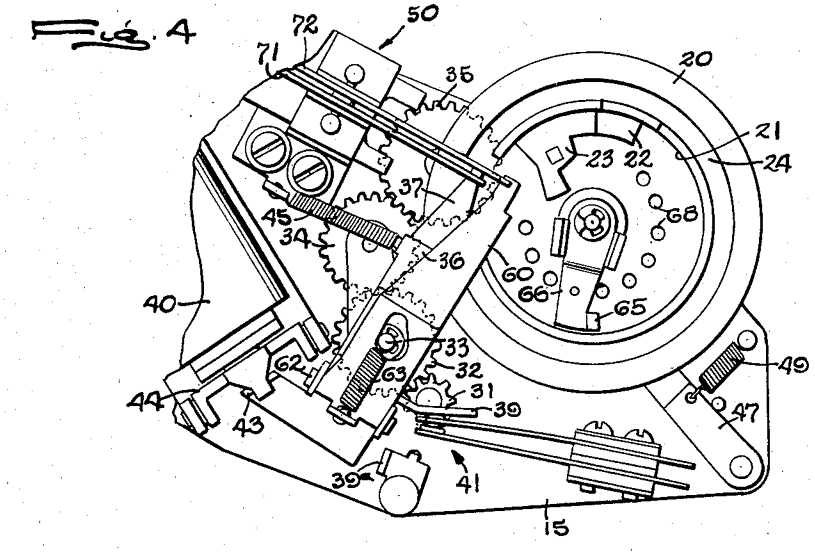
Figs. 4 to 8 are stop motion views similar to Figure 1 but omitting unnecessary details showing the sequence of operation.

To briefly summarize the overall operation of the disclosed receiver, attention is first directed to Fig. 1. Here the magnet 40 is shown deenergized and the carrier lever 36, holding lever 37, and actuator 60 are biased by the spring 45 in a counterclockwise direction against the stop 39*a*. Timing disc 20 is in its initial starting position under the urging of a spring biased arm 47. When a high frequency signal is received on the lines across which the receiver 10 is connected, magnet 40 is energized to pivot the carrier lever 36 in a clockwise direction which in turn carries with it the holding lever 37 and the actuator 60. As the holding lever 37 is pivoted in a clockwise direction, the contacts of switch 41 are closed to energize the timing motor 30 and gear 34 is swung into engagement with gear 35 as shown in Fig. 4, thus driving timing disc 20.

If the magnet 40 remains energized for longer than a predetermined time interval, the disc 20 will rotate in a clockwise direction far enough to allow track 24 to engage and hold the holding lever 37 and the track 21 to engage the runner 64 and hold the actuator 60 in its operative position. This stage of the cycle is shown in Fig. 5.

Figures 5, 6, 7, 8, 9, 10:
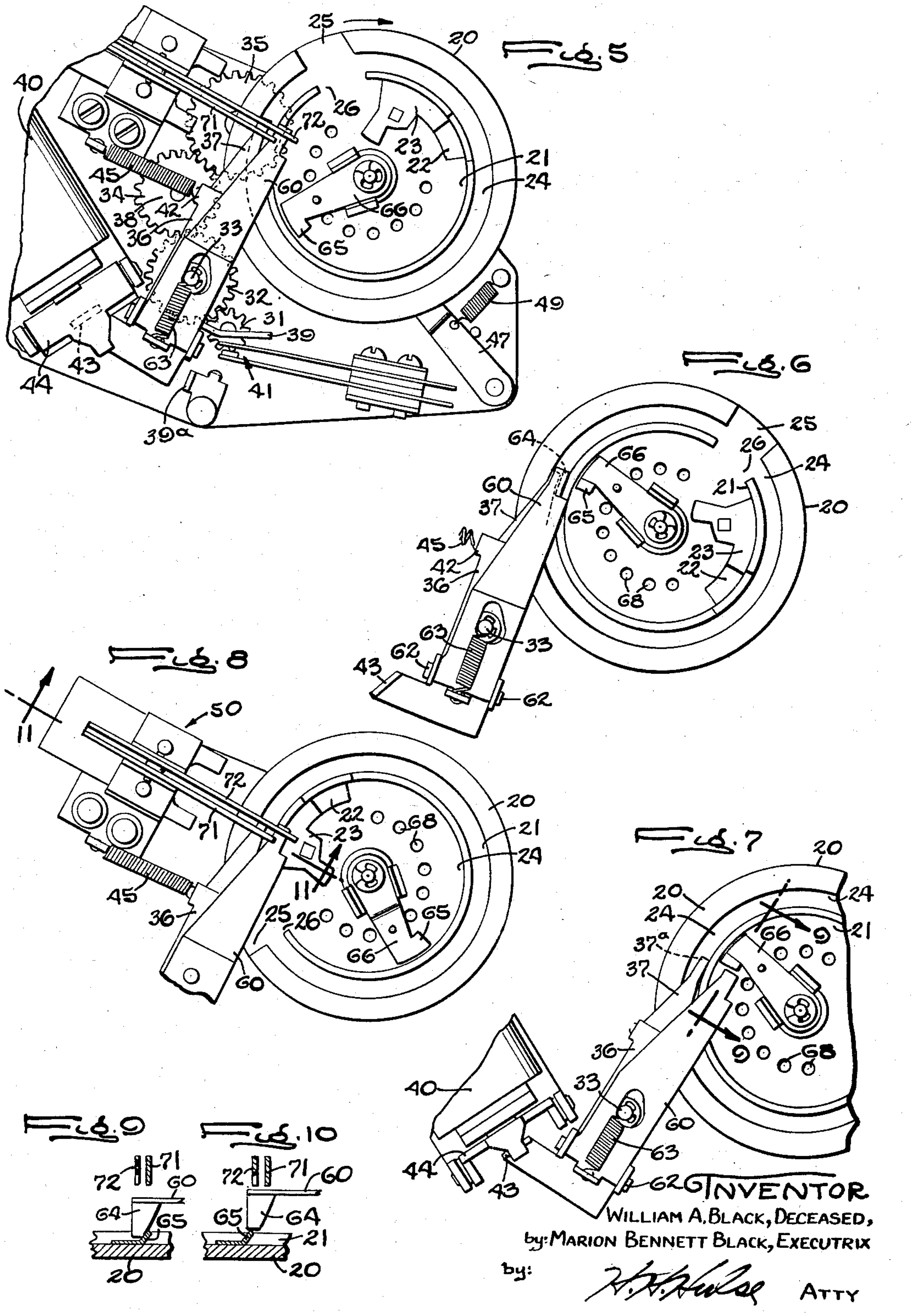
Figs. 9 and 10 are stop motion views taken along line 9—9 of Fig. 7.

Assuming a second signal impulse is not received to energize the magnet 40 at the proper time, the runner 64 will be cammed upwardly by the positionable cam 65 and will snap under the urging of spring 45 away from the track 21 and into engagement with the holding lever 37, as shown in Fig. 6. If, however, a second signal of sustained duration is received so that the magnet remains energized while the cam 65 holds the runner 64 up above the track 21, the runner will drop from the cam 65 back into engagement with the track 21, the position shown in Fig. 7.

When the actuator has been allowed to snap out of the track 21 and into engagement with the holding lever 37, the timing disc 21 completes its full cycle with both the holding lever and the actuator 60 held by the track 24 until the actuator 37 is allowed to spring outwardly through the entryway 25 and break the driving engagement between gears 34, 35 and open switch 41. In this case, since the actuator runner 64 remained on the flat surface of disc 20, the switch assembly 50 is not actuated.

If, however, the magnet 40 was energized during the proper interval so that the cam 65 was not effective to displace the actuator runner 64 from track 21, the runner will be brought into engagement with the cam surface 22 and the actuator will be gradually lifted. When the runner rides on the actuating surface 23, the actuator 60 will be in engagement with the shorter switch lever 71, as shown in Fig. 8. However, if the magnet 40 is energized as the runner 64 rides upwardly on the cam surface 22, the actuator 60 will be displaced inwardly toward the center of the timing disc 20 and will engage the longer switch lever 72 when its runner 64 rests on the actuating surface 23. In either case, one of the switch levers 71, 72 remains actuated as the runner 64 rides on the actuating surface 23. Near the end of the cycle the actuator will drop from the surface 23 onto the disc 20, thereby completing the period of operation of switch assembly 50, and then the actuator 60 will spring outwardly through the entryway 26 in track 21 while the holding lever 67 moves outwardly through the entryway 25 in the track 24, and the parts resume their rest position shown in Fig. 1.

Figure 14:
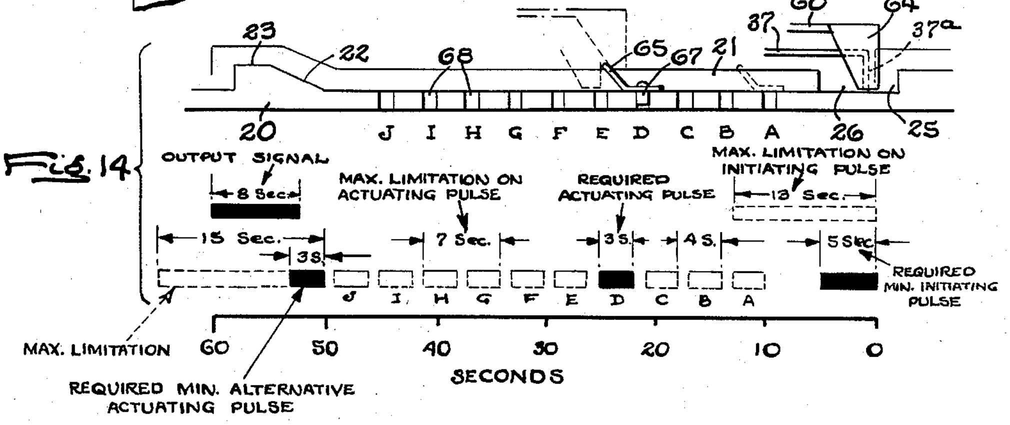
Fig. 14 is a development view taken around the timing disc shown in Fig. 1 and showing the timing of the signals required to produce actuation.

In order to more clearly set forth the operation of the invention, reference will now be made to an arbitrarily adopted set of time intervals which are useful in demonstrating the preferred embodiment of the invention, and for this purpose attention is directed to Fig. 14. In the illustrated embodiment there are ten holes 68 in the disc 20, labeled from "A" to "J," it is possible to install ten similar units 11 on a common power line. To initiate actuation of all ten timing discs 20 in the system, a minimum signal pulse of five seconds is required due to the width of the entryways 25 and 26 in their respective trackways 24, 21. Starting ten seconds after the beginning of the first initiating pulse and continuing at four second intervals thereafter, one of the cams 65 in the ten receiver systems will raise the associated actuator runner 64 to flip it from the trackway 21. It can therefore be seen that the initial actuating pulse cannot last longer than 13 seconds, since a signal of this length would not only initiate the actuation of all ten of the devices but would also hold the actuator 60 in unit "A" beyond the period required for actuation of that unit. In the particular receiver illustrated, the adjustable cam 65 has been positioned in the hole "D," therefore to actuate this unit a second signal must be received beginning 22 seconds from the initiation of the first signal. As previously pointed out, this signal must be of a sustained duration to hold the actuator 60 inwardly as the runner 64 passes over the cam 65. In the illustrated example, this period is on the order of 3 seconds. This interval cannot exceed 7 seconds since, in that case, the actuators of two units might be retained within their tracks 21. Near the end of the timing cycle, a third signal may be received to energize the magnet 40 so as to operate the longer switch arm 72. This signal must also be of sustained duration so as to hold the actuator 60 beneath the arm 72 as it rises along the cam surface 22. It will be noted that this third signal cannot exceed a 15 second interval for to do so would again initiate the operation of the timing disc. It will be understood by those skilled in the art that the number of holes 68 and their relative spacing, the proportions of the cooperating elements, and the rotational speed of disc 20 can be varied to achieve any desired time intervals for the required pulse lengths, and that departures from the examples given above are within the scope of the invention.

Of particular significance in the operation of this device is the fact that the individual signals in the required code pattern must be of sustained duration and, therefore, a casual transient signal cannot cause the device to be actuated.

It can also be noted that once the timing disc 20 is put into operation, the tracks 21 and 24 continuously control the position of both the holding lever 37 and the actuator 60 and a transient signal which may be received during the timing cycle to energize magnet 40 cannot cause either the holding lever 37 or the actuator 60 to be flipped into the path of an abutment or obstruction on the timing disc which would cause the receiver to jam or become locked. Therefore, the apparatus is reliable and foolproof, being completely free of the influence of transient signals both as to the possibility of their causing a false actuation and to the possibility of their causing damage or jamming of the receiver.

I claim as my invention:

1. A coded signal receiver having a tuned circuit for remote control of a device associated with a power line in response to carrier frequency signals superimposed on said line comprising, in combination, a rotary timing disc, means including an electric motor for driving the disc through a full cycle, a control switch, first and second parallel track means on said disc, a switch actuator having a tip for riding in either one of said tracks and having means biasing the same toward said first track, an electromagnet arranged for connection to the tuned circuit, means responsive to actuation of the magnet for starting the motor and for causing the switch actuator tip to move to said second track, means at the end of said second track for imparting movement to said actuator for operation of said control switch, and means including a cam located at a selected point on said disc for camming said actuator tip out of said second track so that it is free to return to the first track under urging of the biasing means unless the magnet remains actuated as the tip and camming means move past each other.

2. A coded signal receiver having a tuned circuit for remote control of a device associated with a power line in response to carrier frequency signals superimposed on said line comprising, in combination, a rotary timing disc, means including an electric motor for driving the disc through a full cycle, a control switch, means defining a track on said disc, a switch actuator having a tip for riding in said track and having means biasing the same away from said track, an electromagnet arranged for connection to the tuned circuit, means responsive to actuation of the magnet for starting the motor and for causing the switch actuator tip to move into said track, means at the end of said track for imparting movement to said actuator for operation of said control switch, and means including a cam located at a selected point on said disc for camming said actuator tip out of said track so that it is free to move away under urging of the biasing means unless said magnet remains actuated as the tip and camming means move past each other.

3. A coded signal receiver having a tuned circuit for remote control of a device associated with a power line in response to carrier frequency signals superimposed on said line, comprising, in combination, a rotary timing disc, means including an electric motor for driving the disc through a full cycle, a control switch, means defining a track on said disc, a switch actuator having a tip for riding in said track and having means biasing the same away from said track, an electromagnet arranged for connection to the tuned circuit, means responsive to actuation of the magnet for starting the motor and for causing the switch actuator tip to move into said track, means at the end of said track for imparting movement to said actuator for operation of said control switch, and means located at a selected point on said disc for releasing said actuator tip so that it is free to move from said track under urging of the biasing means unless said magnet remains actuated as the tip and releasing means move past each other.

4. A coded signal receiver having a tuned circuit for remote control of a device associated with a power line in response to carrier frequency signals superimposed on said line comprising, in combination, a rotary timing disc, means including an electric motor for driving the disc through a full cycle, a control switch, means defining a circular track on said disc having a beginning point and an end point, a switch actuator having a tip for riding in said track and having means biasing the same laterally away from said track, an electromagnet arranged for connection to the tuned circuit, means responsive to actuation of the magnet for starting the motor and for causing the switch actuator tip to move into said track, the beginning point of said track being initially angularly spaced from said tip so that sustained actuation of the magnet is required to hold the tip for movement into the track, means at the end of said track for imparting movement to said actuator for operation of said control switch, and means located at a selected point on said disc for releasing said actuator tip from said track so that it is free to move away at any time during a predetermined time interval under urging of the biasing means unless said magnet remains actuated for the duration of said interval as the tip and releasing means move past each other.

5. In a coded signal receiver for remote control of a device, the combination comprising a rotatable disc having a circular ridge defining a track, a motor for driving said disc, a shiftable actuator having a tip and being biased to urge said tip against said ridge when the actuator is retained by said track, an electromagnet which may be energized to shift said actuator against its bias, means at the end of said track to operate said device if the actuator is retained by the track, and a cam interposed along said track and being adjustably carried by said disc so that its position along the track can be selectively varied, said cam being formed to lift said tip above the level of said ridge and said cam and tip being dimensioned to maintain said tip above the ridge for a finite time interval so that the biased actuator will leave said track unless said electromagnet remains energized during said interval.

6. In a coded signal receiver for remote control of a device, the combination comprising a rotatable disc having a circular ridge defining a track, a motor for driving said disc, a shiftable actuator having a tip and being biased to urge said tip against said ridge when the actuator is retained by said track, an electromagnet which may be energized to shift said actuator against its bias, means at the end of said track to operate said device if the actuator is retained by the track, and means to release said tip from said ridge at any time during a finite time interval so that the biased actuator will leave said track unless said electromagnet remains energized during said interval, said last named means being adjustably carried by said disc so that its position along the track can be selectively varied.

7. A coded signal receiver having a tuned circuit for remote control of a device associated with a power line in response to carrier frequency signals superimposed on said line, comprising, in combination, a movable timing member, means including an electric motor for moving said member through a full cycle, a control switch for said device, means on said member defining a track, a switch actuator having a tip for riding in said track and having means biasing the same away from said track, an electromagnet arranged for connection to the tuned circuit, means responsive to actuation of the magnet for starting the motor and for causing the switch actuator tip to move into said track, means at the end of said track for imparting movement to said actuator for operation of said control switch, and means located at a selected point on said disc for releasing said actuator tip so that it is free to move from said track under urging of the biasing means unless said magnet remains actuated as the tip and releasing means move past each other.

8. In a coded signal receiver for remote operation of a selected one of a pair of switches, the combination comprising, a rotatable disc having a circular ridge defining a track, a motor for driving said disc, a shiftable actuator having a tip and being biased to urge said tip against said ridge when the actuator is retained by said track, an electromagnet which may be energized to shift said actuator against its bias to a position away from said ridge, a first cam positioned along said track to lift said tip above the level of said ridge and allow the biased actuator to leave the track unless said magnet remains energized, a second cam at the end of said track for raising said actuator, a first operator for one of said switches positioned to be operated by said actuator when the latter is raised by said second cam and its tip remains urged against said ridge, and a second operator for the other of said switches positioned to be operated by said actuator when the latter is raised by said second cam and is shifted away from said ridge by the energization of said magnet.

9. In a coded signal receiver for remote operation of a selected one of a pair of switches, the combination comprising, a rotatable disc having a circular ridge defining a track, a motor for driving said disc, a shiftable actuator having a tip and being biased to urge said tip against said ridge when the actuator is retained by said track, an electromagnet which may be energized to shift said actuator against its bias to a position away from said ridge, a cam at the end of said track for raising said actuator, a first operator for one of said switches positioned to be operated by said actuator when the latter is raised by said cam and its tip remains urged against said ridge. and a second operator for the other of said switches positioned to be operated by said actuator when the latter is raised by said cam and is shifted away from said ridge by the energization of said magnet.

References Cited in the file of this patent

UNITED STATES PATENTS

| | | |
|---|---|---|
| 2,677,030 | Frey | Apr. 27, 1954 |
| 2,700,757 | Bradley | Jan. 25, 1955 |
| 2,754,495 | Sprecker et al. | July 10, 1956 |